United States Patent [19]

Mittelhäuser

[11] 4,273,417
[45] Jun. 16, 1981

[54] REAR VIEW MIRROR FOR AUTOMOTIVE VEHICLES

[76] Inventor: Bernhard Mittelhäuser, No. 57, D-3002 Wedemark 2, Fed. Rep. of Germany

[21] Appl. No.: 37,463

[22] Filed: May 9, 1979

[30] Foreign Application Priority Data

May 11, 1978 [DE] Fed. Rep. of Germany ....... 2820541

[51] Int. Cl.³ .............................................. G02B 5/08
[52] U.S. Cl. ................................................... 350/289
[58] Field of Search ........................................ 350/289

[56] References Cited

U.S. PATENT DOCUMENTS

| 3,609,014 | 9/1971 | Kurz, Jr. ............................ 350/289 |
| 3,972,597 | 8/1976 | Repay et al. ........................ 350/289 |

Primary Examiner—F. L. Evans
Attorney, Agent, or Firm—Becker & Becker, Inc.

[57] ABSTRACT

An adjustable rear view mirror for automotive vehicles including an electric motor pivotably mounted so as to be displaceable from an inoperative position into engagement with a first or a second adjusting member for displacing a setting member, to adjust the mirror body via a respective ball-and-socket joint. Manual adjustment devices provided with each adjusting member are pivotably displaceable into engagement with the adjusting members.

15 Claims, 5 Drawing Figures

REAR VIEW MIRROR FOR AUTOMOTIVE VEHICLES

The invention relates to an adjustable rear view mirror for automotive vehicles, having an electric motor arranged to be optionally pivotable into driving engagement with a first or a second adjusting member for adjusting the mirror body, via a driving element located on the motor shaft.

In known mirrors, the swivelling of the electric motor is effected by electromagnets which move the rocker arm of the electric motor into the required position. Apart from the fact that special switching elements are required, it is expensive to incorporate the electromagnets.

It is an object of the invention to provide a rear view mirror which does not require special operating elements for pivotally moving the said electric motor thereof and wherein pivotal movement of the motor occurs automatically with the switching on in one or the other direction of rotation.

This object and other objects and advantages of the invention will appear more clearly from the following specification in connection with the accompanying drawings, in which.

The present invention is characterized primarily by an adjustable rear view mirror for automotive vehicles, including an electric motor which is pivotally displaceable optionally into driving engagement with a first or a second setting member for pivoting the mirror, via a driving element located on its shaft, wherein the shaft has a second driving element for pivotally displacing the electric motor, which element is in engagement with an independently mounted abutment, and the second driving element and/or the abutment is slippingly mounted or is provided as a component of a slip clutch in such a manner that the second driving element, when the electric motor is switched on, brings the electric motor into the operating position of its shaft where it is maintained.

According to one aspect of the invention, when switching on the electric motor, initially the second driving element becomes effective in such a manner that it causes the pivotal displacement of the electric motor. Thus, if the first driving element comes into engagement with one or other of the setting members for adjusting the mirror body, then the return force is overcome in such a manner that the second driving element is able to move relative to its shaft or the abutment relative to its mounting point. This frictional or slip-clutch effect is effective for the duration of the driving work of the electric motor. If the direction of rotation of the motor is reversed (by reversing the polarity), then the electric motor moves to the other setting member, and again, upon engagement with the setting member, an uncoupling of the second driving element occurs, for the duration of the mirror adjustment.

Figure 1:
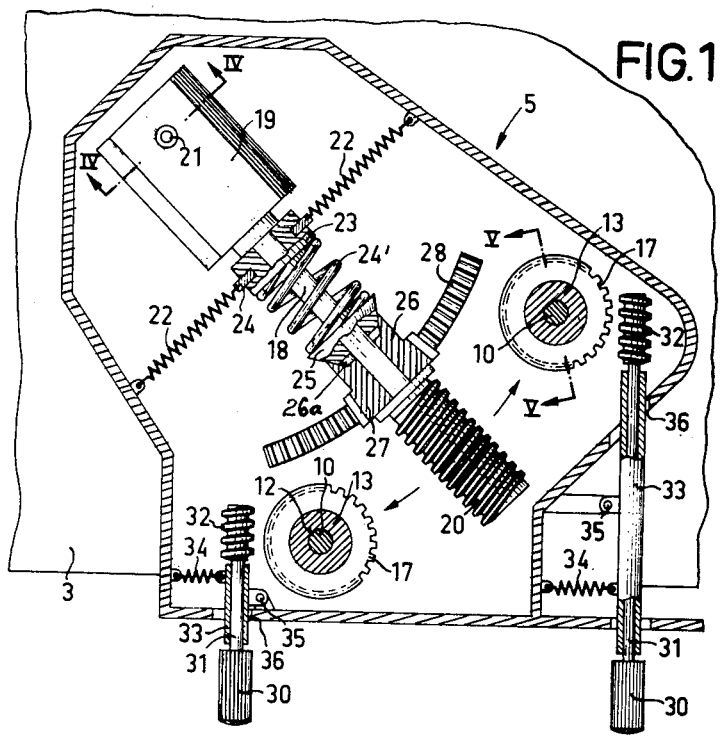
FIG. 1 is a fragmentary view of an external rear view mirror in accordance with one embodiment of the invention for an automotive vehicle, in vertical section.
Figure 2:
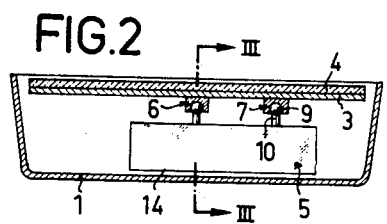
FIG. 2 shows a horizontal section through the mirror in accordance with FIG. 1.
Figure 3:
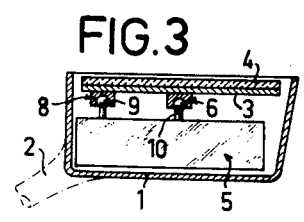
FIG. 3 is a section taken on the line III—III of FIG. 2.
Figure 4:
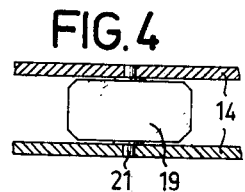
FIG. 4 is a section taken on the line IV—IV of FIG. 1.

Referring now particularly to the drawings, a dish-like housing 1, can be secured to a vehicle, not shown, by a base 2 (see FIGS. 2 and 3). A mirror body 4 is mounted on a rigid plate 3, the adjustment of the mirror body 4 being effected by an electric drive unit generally designated by the numeral 5, FIG. 1, the electric supply leads and switch of which are not shown.

The mirror body 4 is mounted centrally by a ball-and-socket joint 6, with two further ball-and-socket joints 7,8 being associated therewith, each including a cup socket 9 and a longitudinally adjustable setting member 10.

Figure 5:
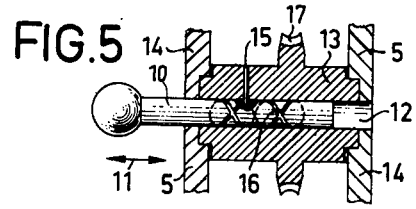
FIG. 5 is a section taken on the line V—V of FIG. 1.

By means of the ball joint 7, with a longitudinal displacement of its respective setting member 10, in accordance with the double arrow 11 (FIG. 5) the mirror is adjusted about a vertical axis, while upon actuation of the setting member 10 of the ball joint 8 the mirror is adjusted about a horizontal axis.

For this purpose, each of the setting members 10 are located in the central bore 12 of a rotary body 13 which is rotatably mounted between the two opposite walls 14 of the unit 5. The rotary body 13 has a radial pin 15 for engagement in a reversing thread or groove 16 of a setting member 10 in such a manner that, during the rotation of the rotary body 13, a setting member 10 (non-rotatably located in its ball joint 7 or 8) is continuously reciprocated. Thus, the mirror body 4 is constantly pivotally reciprocated about a horizontal or vertical axis, and the mirror body 4 passes through all possible positions, but will remain in the required position by stopping the rotary movement of the rotary body 13.

A worm wheel or gear 17 is connected to or provided on the rotary body 13 which is rotatable by means of a worm (endless screw) 20 provided on the free end of a shaft 18 of an electric motor 19, FIG. 1, whereby the rotation of the rotary body 13 and the displacement of a setting member 10 can then be effected.

The electric motor 19 is pivotable about a transverse axle by means of an axle journal 21, in order to enable the worm 20 to be optionally connected with one or the other rotary bodies 13 of a pertaining setting member 10. In the neutral or inoperative position, the worm 20 is located in a central position, i.e. in the position indicated in FIG. 1, in which it is retained by two tension springs 22, which springs 22 act on the pivotable motor 19 via an anchor ring 24 rotatably held in a setting ring 23. This setting ring 23 is firmly secured to the shaft 18, and also serves as rear abutment for a compression spring 24' surrounding the shaft 18. The spring 24' is nonrotatably connected to a cone 25 having a through bore for shaft 18. Cone 25 and the boss 26 of a gearwheel 27 forms a clutch in the form of a slip clutch with a suitable conical aperture 26a being provided in boss 26. The gearwheel 27 is rotatably mounted on the shaft 18, but is able to transmit torque received via the slip clutch, i.e. elements 25 and 26, the compression spring 24' and the setting ring 23. On a wall 14 an arcuate, toothed or racked bar 28 is firmly secured with which the gearwheel 27 meshes in rack and pinion mode.

When the electric motor 19 is switched on, then, depending upon the direction or rotation of the electric motor 19, the gearwheel 27 which is in rolling engagement along the racked bar 28, causes the worm 20 to be moved towards one or other of the wormgear 17 of rotary bodies 13. When the worm 20 comes into contact with a wormgear 17, then pivotal movement of the motor 19 about axle journal 21 is arrested and the slip clutch holds the worm 20 in the operating position, while preventing the shaft 18 from being swung back into the central position due to a spring 22. This return to the central position of shaft 18 cannot occur until the electric motor 19 is switched off or when the direction of rotation of the electric motor 19 is reversed.

It will be understood that the slip clutch has to be dimensioned so as to transmit a sufficient force for adjustment of the mirror. On the other hand, the braking force caused thereby has to be low enough for the electric motor 19 to overcome it.

Instead of the slip clutch described, on shaft 18 there may also be placed a securely mounted gearwheel or friction wheel which is to co-act with a braked wheel which would have to be mounted on the wall 14 or the like. If necessary, this friction wheel with suitable slip could act directly on a rigid surface, e.g. the wall 14.

The central position shown has the considerable advantage that a manual adjustment of the mirror body 4 is alternatively, selectively, possible. For this purpose two worm ends 32 of each respective shaft 31 having manual twist grip ends 30 can adjustably be brought into the operating position. For this purpose, each of the shafts 31 is mounted in a sleeve 33 which may be pivoted from the inoperative position, shown in FIG. 1, against the force of a tension spring 34 to a position which permits engagement of the worm ends 32 with a pertaining worm wheel or gear 17. The sleeve 33 thus normally remains in the vertical rest position, because sleeve 33 abuts, biased by spring action, against a stop 36 on the housing of the unit 5. For manual adjustment of the mirror, accordingly, the manual twist grip ends 30 are gripped, the shafts 31 are pivoted to cause engagement of the worm ends 32 in the worm gear 17 so that the rotary body 13 may be rotated on manual rotation of the shafts 31 in sleeves 33, via the pertaining worm ends 32.

The present invention is, of course, in no way restricted to the specific disclosure of the specification and drawings, but also encompasses any modifications within the scope of the appended claims.

What I claim is:

1. An adjustable mirror assembly for automotive vehicles and the like, comprising:
   a reflector member;
   two setting elements operatively connectible to said reflector member for adjusting the attitude of said reflector member;
   an at least pivotally movable electric motor including an output shaft;
   a first driving means mounted on said motor output shaft for operatively connecting said motor and a pertaining setting element; and
   a second driving means at least in part rotatable mounted on said motor turned shaft for pivotally displacing said electric motor when said electric motor is actuated to bring said first driving means in operative contact with one of said setting elements.

2. An adjustable mirror assembly according to claim 1, and further comprising a housing, wherein said second driving means co-acts with an abutment mounted in said housing so as to permit movement of said abutment.

3. An adjustable mirror assembly according to claim 1, wherein said second driving means is provided as a component of a slip clutch.

4. An adjustable mirror assembly according to claim 1, wherein said second driving means is slippingly mounted.

5. An adjustable mirror assembly according to claim 1, wherein said second driving means is mounted freely rotatable on said shaft and at least indirectly is one half of a slip clutch.

6. An adjustable mirror assembly according to claim 5, in which said clutch is a cone clutch.

7. An adjustable mirror assembly according to claim 2, in which said abutment is a curved racked bar and the second driving element is a gearwheel.

8. An adjustable mirror assembly according to claim 1, wherein said second driving element is mountable on said shaft between said motor and a worm screw which forms said first driving element.

9. An adjustable mirror assembly according to claim 1, wherein said electric motor is locatable in a neutral position in which its longitudinal central axis extends substantially centrally between the two setting elements and further including for each setting element a manual adjustment device.

10. An adjustable mirror assembly according to claim 9, wherein each of said manual adjustment devices is pivotally mounted and resiliently biassed to assume an operative position and a rest position.

11. An adjustable mirror assembly according to claim 10, in which each of said manual adjustment devices includes a shaft having a worm screw end, a manually rotary handgrip at its opposite end, and a pivotally mounted sleeve surrounding the pertaining shaft between said two ends.

12. An adjustable mirror assembly according to claim 9, wherein said motor is retained in an inoperative position by spring force.

13. An adjustable mirror assembly according to claim 12, wherein the spring force is provided by two opposing tension springs.

14. An adjustable mirror assembly according to claim 2, wherein said housing includes at least two parallel walls, and said electric motor and said first and second driving means for said setting elements being mounted between said parallel walls.

15. An adjustable mirror assembly according to claim 14, wherein recesses are provided in said parallel walls for pertaining components.

* * * * *